(12) United States Patent
Larsson et al.

(10) Patent No.: US 12,044,274 B2
(45) Date of Patent: Jul. 23, 2024

(54) ACTUATOR DEVICE FOR A FRICTION CLUTCH

(71) Applicants: Ningbo Geely Automobile Research & Development Co., Ltd., Ningbo (CN); Zhejiang Geely Holding Group Co., Ltd., Zhejiang (CN)

(72) Inventors: Johannes Larsson, Gothenburg (SE); Fredrik Furst, Gothenburg (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/202,897

(22) Filed: May 27, 2023

(65) Prior Publication Data
US 2023/0304541 A1 Sep. 28, 2023

Related U.S. Application Data

(63) Continuation of application No. PCT/CN2021/133103, filed on Nov. 25, 2021.

(30) Foreign Application Priority Data

Dec. 16, 2020 (EP) .................................... 20214453

(51) Int. Cl.
*F16D 28/00* (2006.01)
*F16D 13/52* (2006.01)
*F16D 121/24* (2012.01)

(52) U.S. Cl.
CPC ............. *F16D 28/00* (2013.01); *F16D 13/52* (2013.01); *F16D 2121/24* (2013.01)

(58) Field of Classification Search
CPC ..................... F16D 13/00–76; F16D 2023/141
See application file for complete search history.

(56) References Cited

U.S. PATENT DOCUMENTS

| 4,529,077 A | 7/1985 | Renaud |
| 5,353,902 A * | 10/1994 | Flowtow ................. F16D 28/00 |
| | | 192/99 S |

(Continued)

FOREIGN PATENT DOCUMENTS

| CN | 102359510 A | 2/2012 |
| CN | 103890433 A | 6/2014 |

(Continued)

OTHER PUBLICATIONS

International Search Report from corresponding International Application No. PCT/CN2021/133103, mailed on Feb. 15, 2022, 2 pages.

*Primary Examiner* — Ernesto A Suarez
*Assistant Examiner* — Lillian T Nguyen
(74) *Attorney, Agent, or Firm* — Tucker Ellis LLP

(57) ABSTRACT

An actuator device for a friction clutch. The device includes a push lever arm for applying a force on the friction clutch and a push ring arranged on the push lever arm for contacting the friction clutch, and a drive unit connected to the push lever arm for movement of the push lever arm in a push lever arm movement direction. The device further includes a bearing arranged on the push lever arm, where the push ring is journaled by the bearing such that the push ring is rotatable relative to the push lever arm about a rotation axis. The push ring and the bearing are pivotally connected to the push lever arm such that the push ring and the bearing are pivotable relative to the push lever arm about a push ring pivot axis.

12 Claims, 4 Drawing Sheets

(56) References Cited

U.S. PATENT DOCUMENTS

| | | | |
|---|---|---|---|
| 9,109,634 B2 | 8/2015 | Trönnberg | |
| 10,215,239 B2 * | 2/2019 | Eguchi | F16D 23/12 |
| 2018/0223917 A1 * | 8/2018 | Saito | F16H 25/12 |

FOREIGN PATENT DOCUMENTS

| | | | | |
|---|---|---|---|---|
| CN | 106050901 A | 10/2016 | | |
| CN | 110062853 A | 7/2019 | | |
| DE | 102009056297 A1 | 6/2011 | | |
| DE | 102011079956 A1 | 1/2013 | | |
| DE | 102012212460 A1 | 1/2014 | | |
| DE | 102015216354 A1 | 3/2017 | | |
| EP | 2336587 A1 | 6/2011 | | |
| JP | H07253123 A | 10/1995 | | |
| WO | WO-2015018410 A1 * | 2/2015 | | F16D 23/14 |

\* cited by examiner

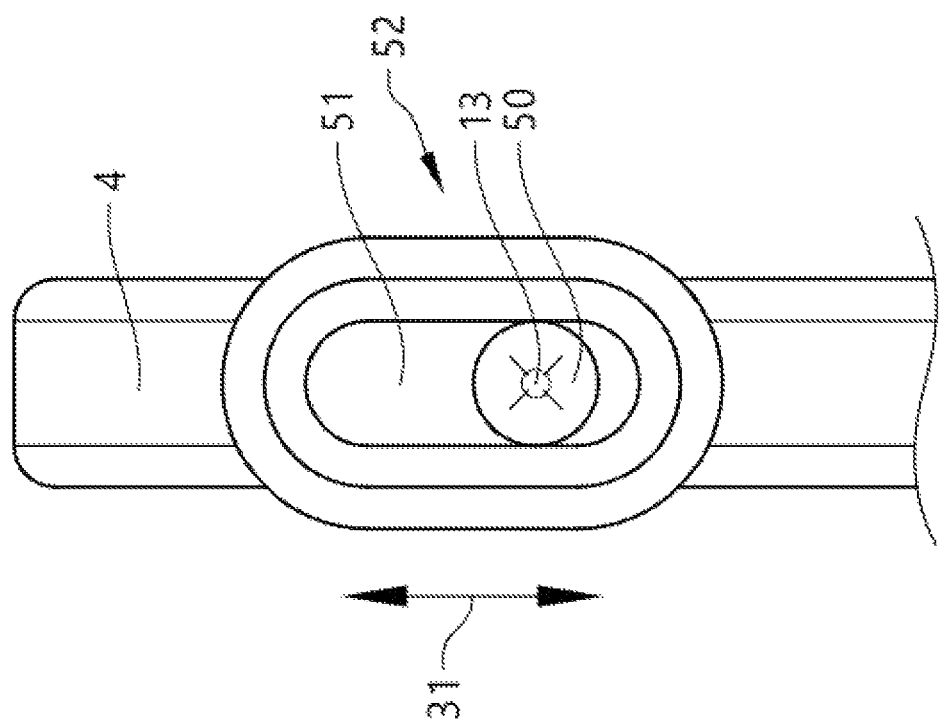
FIG. 2C B-B
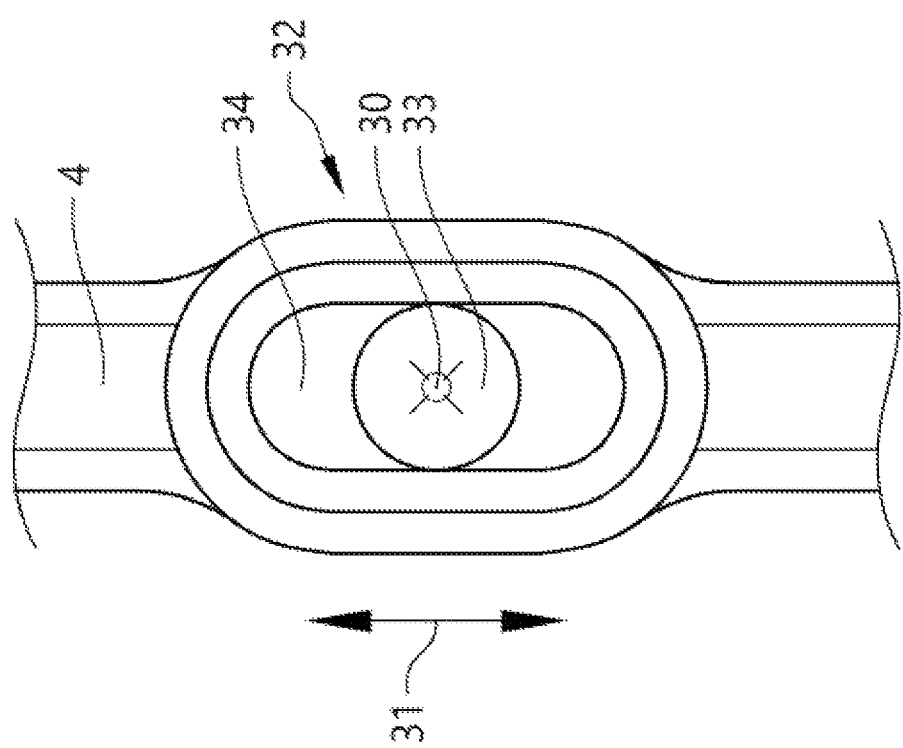
FIG. 2B A-A

ACTUATOR DEVICE FOR A FRICTION CLUTCH

RELATED APPLICATION DATA

This application is a continuation of International Patent Application No. PCT/CN2021/133103, filed Nov. 25, 2021, which claims the benefit of European Patent Application No. 20214453.1, filed Dec. 16, 2020, the disclosures of which are incorporated herein by reference in their entireties.

TECHNICAL FIELD

The invention relates to an actuator device for a friction clutch, particularly for a transmission clutch of a vehicle, which actuator device comprises a push lever arm for applying a force on the friction clutch and a push ring arranged on the push lever arm for contacting the friction clutch.

BACKGROUND

The clutches of a transmission often have an actuator based on a rotating piston pressurized by oil.

Such a solution can have benefits in a high pressure system with many clutches and complex lubrication. In a less complicated transmission using a dry clutch, for instance, such an actuator will however require a lot of components, such as pump, accumulator, valves, oil filter, etc., for this purpose only.

These components contribute to the complexity and costs of the transmission.

SUMMARY

An objective of the invention is to provide an actuator device for a friction clutch, which actuator device has no need of high pressure oil for actuation or lubrication.

The objective is achieved by an actuator device for a friction clutch, where the device comprises a push lever arm for applying a force on the friction clutch and a push ring arranged on the push lever arm for contacting the friction clutch, a drive unit connected to the push lever arm for movement of the push lever arm in a push lever arm movement direction, and a bearing arranged on the push lever arm, where the push ring is journaled by the bearing such that the push ring is rotatable relative to the push lever arm about a rotation axis, and where the push ring and the bearing are pivotally connected to the push lever arm such that the push ring and the bearing are pivotable relative to the push lever arm about a push ring pivot axis.

The invention is based on the insight that by such an actuator device, the actuation of a transmission clutch can be performed without using high pressure oil and components associated therewith, and therefore the complexity of a transmission can be reduced. There is no need of high oil pressure for maintaining the force or pressure applied on the clutch.

By the possibility to pivot the push ring about the push ring pivot axis, the direction of the rotation axis of the push ring can be maintained even if the push lever arm would be somewhat tilted. The wear can be reduced and the efficiency can be increased.

The driving unit can comprise a motor, for example an electric motor, and a linear actuator mechanism comprising a threaded rod with a nut, such as a ball screw for instance, where the linear actuator mechanism is driven by the motor.

According to one embodiment, the push ring and the bearing are displaceably arranged in the push lever arm allowing adjustment of the push ring pivot axis position relative to the push lever arm, and preferably the push ring and the bearing are displaceable in a direction substantially perpendicular to the push ring pivot axis and the push lever arm movement direction. Hereby, the distance between the rotation axis of the push ring and the drive unit, can be maintained even in case the push lever arm would be somewhat tilted. The wear can be reduced and the efficiency can be increased.

According to one embodiment, the rotation axis and the push ring pivot axis are arranged substantially perpendicular relative to each other. Hereby, the rotation axis of the push ring can be maintained in the same plane while the push ring being pivoted. The wear can be reduced and the efficiency can be increased.

According to a further embodiment, the push lever arm movement direction is substantially perpendicular to the push ring pivot axis. Hereby, pivoting of the push ring for compensating for any tilting of the push lever arm can be performed while maintaining the rotation axis in parallel with the push lever arm movement direction. The wear can be reduced and the efficiency can be increased.

According to a further embodiment, the push lever arm is pivotally connected to the drive unit such that the push lever arm is pivotable relative to the drive unit about a drive unit pivot axis, and preferably an outer end of the push lever arm is pivotally connected to the drive unit for pivoting about the drive unit pivot axis. Hereby, the push lever arm can be moved while pivoting relative to the drive unit. This in turn increases the flexibility and enables the push lever arm to be pivotably attached to a fix point too, such as a transmission housing wall, for increasing the stability of the push lever arm.

For example, the push lever arm can be connected to the nut of the linear actuator mechanism, the push lever arm is preferably pivotally connected to the nut of the linear actuator mechanism for pivoting about the drive unit pivot axis.

According to a further embodiment, the push lever arm is pivotally connected to a fix point of the transmission such that the push lever arm is pivotable relative to the fix point about a fix point pivot axis, and preferably an outer end of the push lever arm is pivotally connected to the fix point for pivoting about the fix point pivot axis. Hereby, the stability of the push lever arm is increased since the push lever arm can be connected in a first outer end and a second outer end to the drive unit and the fix point, respectively. The fix point is suitably a position on a transmission housing. This in turn enables a thinner push lever arm to be used. Further, this enables the use of a lower force from the drive unit since the force applied by the push ring on the clutch will be increased through the leverage created.

According to a further embodiment, the push ring pivot axis and the drive unit pivot axis are arranged substantially in parallel to each other. Hereby, the direction of the rotation axis of the push ring can be adjusted in case of any tilting of the push lever arm caused by pivoting about the drive unit pivot axis. The wear can be reduced and the efficiency can be increased.

The drive unit pivot axis and the fix point pivot axis are preferably arranged substantially in parallel to each other. Then, the push ring pivot axis and the fix point pivot axis are arranged substantially in parallel to each other, and preferably the push ring pivot axis is arranged between the drive unit pivot axis and the fix point pivot axis. Hereby, a compact and robust design, where the push lever arm is secured in two ends thereof with the push ring arranged in the centre of the push lever arm, can be achieved.

According to another aspect of the invention, a further objective is to provide a friction clutch, for example a dry friction clutch, comprising such an actuator device.

According to a further aspect of the invention, a further objective is to provide a transmission comprising a friction clutch and such an actuator device.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings:

FIG. 2B is an enlarged view A-A of a portion of a push lever arm of the actuator device illustrated in FIG. 2A, FIG. 2C is an enlarged view B-B of a portion of the push lever arm of the actuator device illustrated in FIG. 2A.

DETAILED DESCRIPTION OF EXAMPLE EMBODIMENTS

Figure 1:
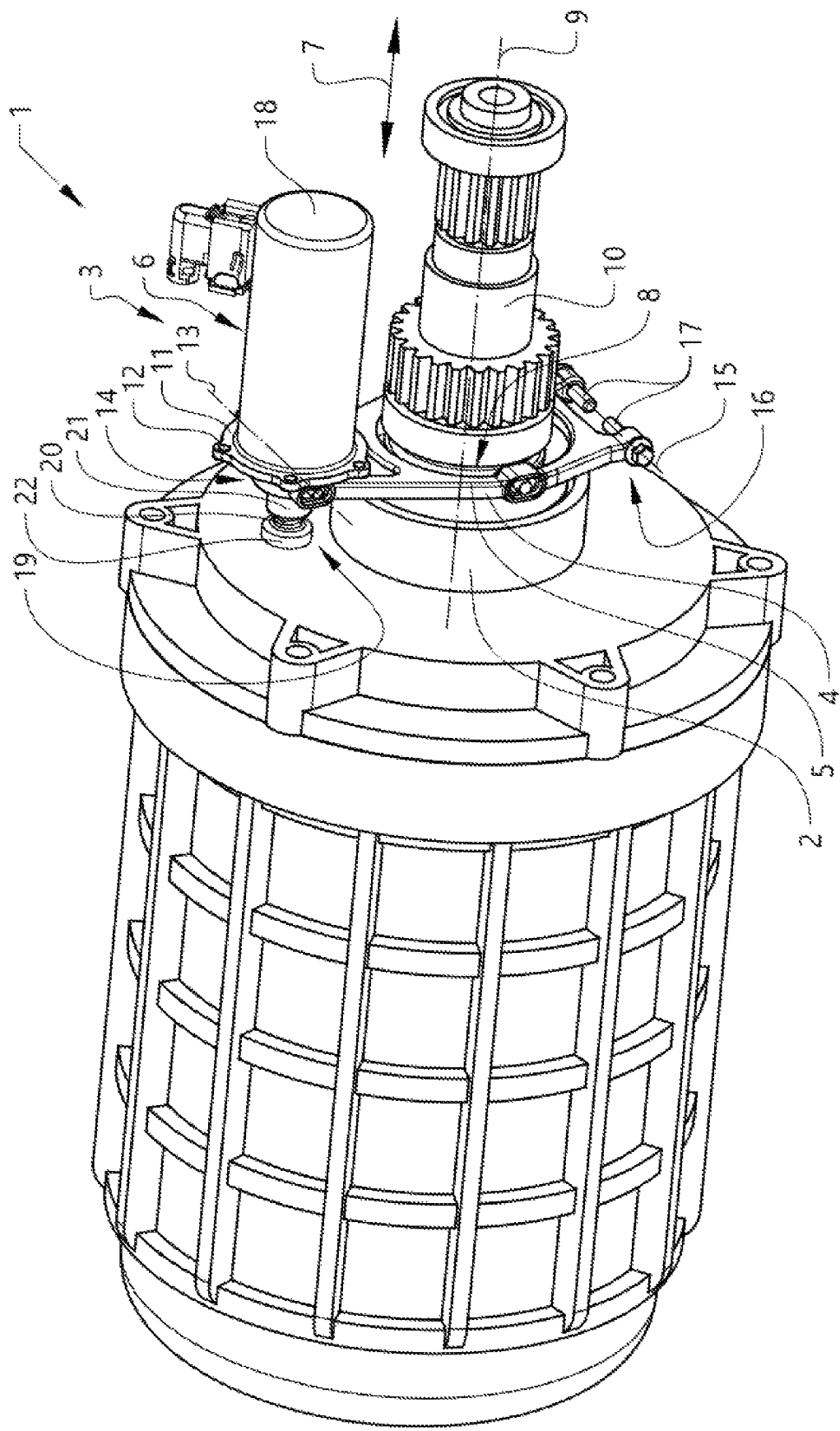
FIG. 1 is a perspective view of a transmission with a friction clutch and an actuator device for actuation of the friction clutch.

FIG. 1 shows a transmission 1 for a vehicle. Some of the components of the transmission 1 are illustrated and will be explained hereinafter. Components of the transmission not relevant to the invention have been omitted. The vehicle transmission 1 has a friction clutch 2 and an actuator device 3 for actuation of the friction clutch 2. The friction clutch 2 is suitably a dry friction clutch.

The actuator device 3 comprises a push lever arm 4 for applying a force or pressure on the friction clutch 2 and a push ring 5 arranged on the push lever arm 4 for contacting the friction clutch 2, and a drive unit 6 connected to the push lever arm 4 for movement of the push lever arm 4 in a push lever arm movement direction 7, preferably a linear movement.

The drive unit 6 is suitably arranged for linear movement of the push lever arm 4, i.e. the connection or coupling point between the drive unit 6 and the push lever arm 4 is moved linearly in the push lever arm movement direction 7. The push lever arm movement direction 7 is preferably substantially in parallel with a rotation axis of the clutch 2. The push lever arm 4 can also be arranged to pivot slightly at the same time as the push lever arm moves in the push lever arm movement direction 7, as will be described hereinafter.

The actuator device 3 further comprises a bearing 8 arranged on the push lever arm 4, by which bearing 8 the push ring 5 is journaled such that the push ring 5 is rotatable relative to the push lever arm 4 about a rotation axis 9. The rotation axis 9 is the same as the rotation axis of the friction clutch 2, such that the push ring 5 can rotate about the rotation axis 9 together with a rotating component of the friction clutch 2 when the push ring 5 is brought into contact with the rotating component. See also FIGS. 2A and 3. In the example embodiment illustrated in FIG. 1, the push ring 5 is arranged outside a shaft 10 such that the shaft 10 extends through the opening of the push ring 5.

The drive unit 6 is attached to a fix point such as a wall of a transmission housing (not shown). For this purpose, the drive unit 6 can have a flange 11 with bolt holes 12 as indicated in FIG. 1.

The push lever arm 4 is connected to the drive unit 6 such that the push lever arm 4 can be moved by the drive unit 6 towards the friction clutch 2. Optionally, the push lever arm 4 is pivotally connected to the drive unit 6 such that the push lever arm 4 is pivotable relative to the drive unit 6 about a drive unit pivot axis 13. For example, a first outer end 14 of the push lever arm 4 can be pivotally connected to the drive unit 6 for pivoting about the drive unit pivot axis 13. See also FIG. 2A.

Further, optionally the push lever arm 4 is pivotally connected to a fix point, a wall of a transmission housing (not shown) for instance, such that the push lever arm 4 is pivotable relative to the fix point about a fix point pivot axis 15. For example, a second outer end 16 of the push lever arm 4 is pivotally connected to the fix point for pivoting about the fix point pivot axis 15. For this purpose, the push lever arm 4 can have pivot joint pins 17 to be received by corresponding means of the transmission housing wall, as indicated in FIG. 1.

Such a solution requires that the push lever arm be somewhat displaceable relative to one of the drive unit pivot axis and the fix point pivot axis, or one of the pivot axes is displaceable. For example, the pivot joint pins 17 can be received by corresponding slots of the housing, such that the push lever arm can be both pivoted and displaced relative to the housing to compensate for the otherwise changed distance between the drive unit pivot axis 13 and the fix point pivot axis 15 when the push lever arm 4 is moved in the push lever arm movement direction 7. In another embodiment, slots for the pivot joint pins 17 are arranged in the push lever arm instead and corresponding bore holes for the pins are arranged in the housing. In a further variant, as further explained with reference to FIGS. 2A and 2C, the push lever arm is somewhat displaceable relative to the drive unit 6. For example, pins 50 providing the drive unit pivot axis 13 can be fixedly arranged in the drive unit 6 and the pins 50 are received by slots 51 arranged in the push lever arm 4, such that the push lever arm 4 is displaceable relative to the drive unit 6.

In the example embodiment illustrated in FIG. 1, the push lever arm 4 is pivotally connected to the drive unit 6 at an upper position situated at a first side of the push ring 5 and the rotation axis 9, and the push lever arm 4 is pivotally connected to a fix point of the transmission housing at a lower position situated at a second opposite side of the push ring 5 and the rotation axis 9.

The drive unit 6 can comprise a motor 18 and a linear actuator mechanism 19 driven by the motor 18. The linear actuator mechanism 19 can have a threaded rod 20 and a nut 21 arranged on the threaded rod 20. The push lever arm 4 can be connected to the nut 21 of the linear actuator mechanism 19, preferably pivotally connected to the nut 21. By rotating the threaded rod 20 by means of the motor 18, preferably an electric motor, the nut 21 and thereby the push lever arm 4 connected to the nut 21, can be moved in said push lever arm movement direction 7 towards the friction clutch 2 or away from the friction clutch 2.

In addition, optionally the actuator device 3 can comprise a support member 22 for the threaded rod 20. Such a support member 22 may comprise a bearing for journaling the outer end of the threaded rod 20 where the bearing is arranged for example in a wall of the transmission housing.

Figure 2A:
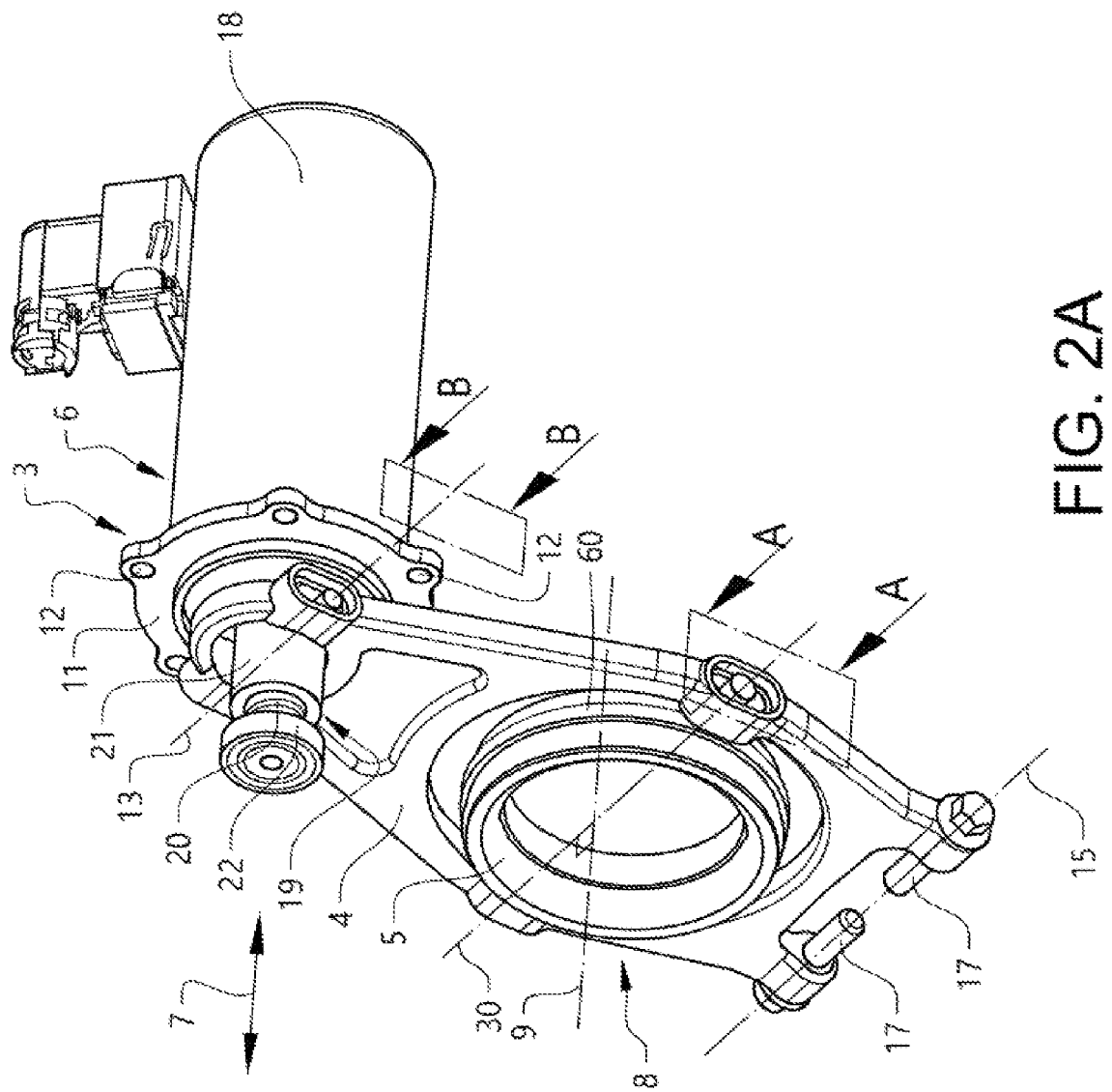
FIG. 2A is a perspective view of the actuator device illustrated in FIG. 1.

FIG. 2A is a perspective view of the actuator device 3 illustrated in FIG. 1, and FIGS. 2B and 2C are enlarged views of portions of the push lever arm 4 of the actuator device 3 illustrated in FIG. 2A.

As previously described hereinabove, the push ring 5 is journaled by the bearing 8 such that the push ring 5 is rotatable relative to the push lever arm 4 about the rotation axis 9. Further, the push ring 5 and the bearing 8 are pivotally connected to the push lever arm 4 such that the push ring 5 and the bearing 8 are pivotable relative to the push lever arm 4 about a push ring pivot axis 30. That means the push ring 5 and the bearing 8 together, can pivot about the push ring pivot axis 30.

As further illustrated in FIG. 2B, the push ring 5 and the bearing 8 are suitably displaceably arranged in the push lever arm 4 allowing adjustment of the position of the push ring pivot axis 30 relative to the push lever arm 4. That means the push ring 5 and the bearing 8 together, can be displaced relative to the push lever arm 4.

The push ring 5 and the bearing 8 can be displaceable in a direction 31 substantially perpendicular to the push ring pivot axis 30 and the intended push lever arm movement direction 7. The displacement direction 31 relative to the push lever arm movement direction 7 is however slightly changed when the push lever arm 4 is moved in the push lever arm movement direction 7 while pivoting about the drive unit pivot axis 13 (and the fix point pivot axis 15).

The push ring 5 and the bearing 8 can be displaceable by a sliding mechanism 32 comprising pins 33 and slots 34.

Figure 3:
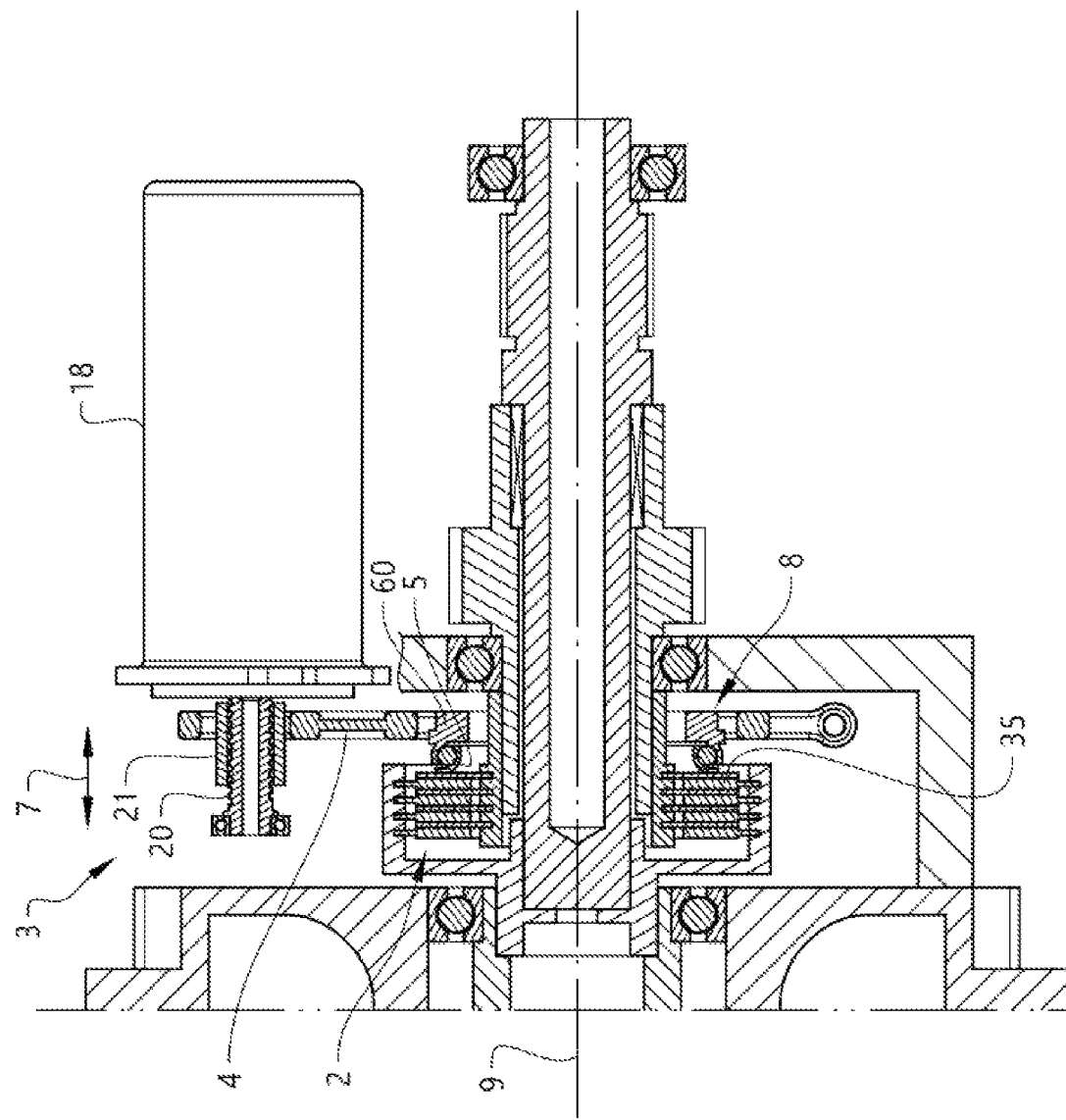
FIG. 3 is a cut view of the transmission illustrated in FIG. 1, where a push ring of the actuator device is in contact with a dry friction clutch.

A combined pivot and sliding mechanism can be achieved for example by arranging the push ring 5 in a further ring with the bearing 8 arranged between the push ring 5 and the further ring, allowing the push ring 5 to rotate about the rotation axis 9 relative to the further ring. The further ring is in turn provided with the pins 33 which are arranged in the slots 34 of the push lever arm 4. In another embodiment as also is illustrated in FIGS. 2A and 3, the push ring 5 is a part of the bearing 8. An outer ring 60 of the bearing 8 arranged in the push lever arm 4 is provided with the pins 33 received by the slots 34 of the push lever arm 4, and an inner ring of the bearing 8 constitutes the push ring 5 which can rotate about the rotation axis 9.

Optionally, it would also be possible to use an outer ring of a bearing as push ring and the inner ring of the bearing arranged pivotable and displaceable relative to the push lever arm.

The rotation axis 9 and the push ring pivot axis 30 are arranged substantially perpendicular relative to each other. Further, the rotation axis 9 of the push ring 5 is arranged substantially in parallel with the push lever arm movement direction 7. Due to the pivoting of the push ring 5 (and the bearing 8) about the push ring pivot axis 30, the rotation axis 9 of the push ring 5 can always be in parallel with the push lever arm movement direction 7 and the rotation axis of the friction clutch during operation. Otherwise, in the same way as indicated hereinabove, the direction of the rotation axis 9 relative to the push lever arm movement direction 7 would be slightly changed when the push lever arm 4 is moved in the push lever arm movement direction 7 while pivoting about the fix point pivot axis 15.

By means of the sliding mechanism 32, the distance between the rotation axis 9 of the push ring 5 and the linear actuator mechanism 19 of the drive unit 6, can be maintained.

In the example embodiment illustrated in FIGS. 1 and 2A, the intended push lever arm movement direction 7 is substantially perpendicular to the push ring pivot axis 30. Further, the push ring pivot axis 30 and the drive unit pivot axis 13 are arranged substantially in parallel to each other, and the push ring pivot axis 30 and the fix point pivot axis 15 are arranged substantially in parallel to each other. This means that the drive unit pivot axis and the fix point pivot axis are suitably arranged substantially in parallel to each other. Further, the push ring pivot axis 30 is preferably arranged between the drive unit pivot axis 13 and the fix point pivot axis 15.

In the example embodiment illustrated in FIG. 2A, the push lever arm 4 is somewhat displaceable relative to the drive unit 6 in the direction 31 substantially perpendicular to the push ring pivot axis 30 and the push lever arm movement direction 7. The pins 50 providing the drive unit pivot axis 13 are fixedly arranged in the nut 21 of the drive unit 6 and the pins 50 are received by the slots 51 arranged in the push lever arm 4, such that the push lever arm 4 is both pivotable and displaceable relative to the drive unit 6. As illustrated in FIG. 2C, a combined pivot and sliding mechanism can be achieved in a corresponding way as previously described for the push ring, by means of a sliding mechanism 52 comprising the pins 50 of the nut 21 and the slots 51 of the push lever arm 4 receiving the pins 50.

FIG. 3 is a cut view of a part of the transmission illustrated in FIG. 1, where the push ring 5 of the actuator device 3 is in contact with a dry friction clutch 2 having a set of friction discs 35. By means of the actuator device 3, the push lever arm 4 and the push ring 5 can be moved in the push lever arm movement direction 7, and thereby the push ring 5 can be brought into contact with the friction clutch 2 for applying a force on the friction clutch 2. The drive unit 6 comprises the motor 18, the threaded rod 20 and the nut 21 to which the push lever arm 4 is pivotally connected. The inner ring of the bearing 8 constitutes the push ring 5 which can rotate relative to the push lever arm 4 about the rotation axis 9 while the outer ring 60 of the bearing 8 is standing still. The outer ring 60 is arranged in the push lever arm 4 and by pins and slots the outer ring 60 is pivotable and displaceable relative to the push lever arm 4 to compensate for any tilting of the push lever arm 4.

In FIG. 3, when applying a force on the clutch, this corresponds to a movement of the push ring 5 to the left. The push ring 5 can also be removed from the friction clutch 2 by means of the actuator device 3, by movement of the push ring 5 to the right in FIG. 3.

It is to be understood that the present invention is not limited to the embodiments described above and illustrated in the drawings; rather, the skilled person will recognize that many changes and modifications may be made within the scope of the appended claims.

What is claimed is:

1. The actuator device for a friction clutch, the device comprising:
   a push lever arm for applying a force on the friction clutch having a first end and a second end opposite the first end, the push lever arm including first slots at the first end and second slots between the first end and the second end;
   a bearing arranged on the push lever arm having pins configured to be received in the second slots;
   a push ring arranged on the push lever arm for contacting the friction clutch, the push ring being journaled by the bearing such that the push ring is rotatable relative to the push lever arm about a rotation axis;

a drive unit connected to the push lever arm with a nut having pins configured to be received in the first slots for movement of the push lever arm in a push lever arm movement direction; and wherein the push ring and the bearing are pivotally arranged in the second slots of the push lever arm such that the push ring and the bearing are pivotable relative to the push lever arm about a push ring pivot axis, and wherein the push ring and the bearing are displaceably arranged in the second slots of push lever arm allowing adjustment of the position of the push ring pivot axis relative to the push lever arm, the push ring and the bearing being displaceable in a direction substantially perpendicular to the push ring pivot axis and the push lever arm movement direction.

2. The actuator device according to claim 1, wherein the rotation axis and the push ring pivot axis are arranged substantially perpendicular relative to each other.

3. The actuator device according to claim 1, wherein the push lever arm movement direction is substantially perpendicular to the push ring pivot axis.

4. The actuator device according to claim 1, wherein the push lever arm is pivotally connected to the drive unit such that the push lever arm is pivotable relative to the drive unit about a drive unit pivot axis.

5. The actuator device according to claim 4, wherein the push ring pivot axis and the drive unit pivot axis are arranged substantially in parallel to each other.

6. The actuator device according to claim 4, wherein the drive unit comprises a motor and a linear actuator mechanism driven by the motor, the linear actuator mechanism having a threaded rod and the nut is arranged on the threaded rod and wherein the push lever arm is pivotally connected to the nut of the linear actuator mechanism for pivoting about the drive unit pivot axis.

7. The actuator device according to claim 4, wherein the push lever arm is pivotally connected to a fix point such that the push lever arm is pivotable relative to the fix point about a fix point pivot axis and wherein the push ring pivot axis is arranged between the drive unit pivot axis and the fix point pivot axis.

8. The actuator device according to claim 1, wherein the drive unit comprises a motor and a linear actuator mechanism driven by the motor, the linear actuator mechanism having a threaded rod and the nut is arranged on the threaded rod.

9. The actuator device according to claim 1, wherein the push lever arm is pivotally connected to a fix point such that the push lever arm is pivotable relative to the fix point about a fix point pivot axis.

10. The actuator device according to claim 9, wherein the push ring pivot axis and the fix point pivot axis are arranged substantially in parallel to each other.

11. The friction clutch comprising an actuator device according to claim 1.

12. A transmission comprising the friction clutch and the actuator device according to claim 1.

\* \* \* \* \*